(12) United States Patent
Aliseychik et al.

(10) Patent No.: US 9,323,995 B2
(45) Date of Patent: Apr. 26, 2016

(54) IMAGE PROCESSOR WITH EVALUATION LAYER IMPLEMENTING SOFTWARE AND HARDWARE ALGORITHMS OF DIFFERENT PRECISION

(71) Applicant: LSI Corporation, San Jose, CA (US)

(72) Inventors: Pavel A. Aliseychik, Moscow (RU); Ivan L. Mazurenko, Moscow (RU); Aleksey A. Letunovskiy, Moscow (RU); Alexander A. Petyushko, Moscow (RU); Alexander B. Kholodenko, Moscow (RU)

(73) Assignee: Avago Technologies General IP (Sinagpore) Pte. Ltd., Singapore (SG)

( * ) Notice: Subject to any disclaimer, the term of this patent is extended or adjusted under 35 U.S.C. 154(b) by 162 days.

(21) Appl. No.: 14/238,522

(22) PCT Filed: Sep. 13, 2013

(86) PCT No.: PCT/US2013/059704
§ 371 (c)(1),
(2) Date: Feb. 12, 2014

(87) PCT Pub. No.: WO2014/143154
PCT Pub. Date: Sep. 18, 2014

(65) Prior Publication Data
US 2016/0004919 A1    Jan. 7, 2016

(30) Foreign Application Priority Data

Mar. 11, 2013    (RU) ................................ 2013110494

(51) Int. Cl.
*G06K 9/52*    (2006.01)
*G06K 9/00*    (2006.01)
(Continued)

(52) U.S. Cl.
CPC ........ *G06K 9/00986* (2013.01); *G06K 9/00369* (2013.01); *G06K 9/00389* (2013.01);
(Continued)

(58) Field of Classification Search
USPC ......... 382/103, 107, 206, 209, 218, 284, 294; 358/537, 540, 450
See application file for complete search history.

(56) References Cited

U.S. PATENT DOCUMENTS

| | | | |
|---|---|---|---|
| 5,133,020 A * | 7/1992 | Giger | A61B 6/502 |
| | | | 382/128 |
| 5,956,090 A | 9/1999 | Yamauchi | |

(Continued)

FOREIGN PATENT DOCUMENTS

| | | |
|---|---|---|
| EP | 2538388 A1 | 12/2012 |
| WO | 2012/093147 A1 | 7/2012 |
| WO | PCT/US2013/059704 | 1/2014 |

OTHER PUBLICATIONS

R. Nock et al., "Statistical Region Merging," IEEE Transactions on Pattern Analysis and Machine Intelligence, Nov. 2004, pp. 1452-1458, vol. 26, No. 11.
(Continued)

*Primary Examiner* — Yosef Kassa

(57) ABSTRACT

An image processor comprises image processing circuitry implementing a plurality of processing layers including at least an evaluation layer and a recognition layer. The evaluation layer comprises a software-implemented portion and a hardware-implemented portion, with the software-implemented portion of the evaluation layer being configured to generate first object data of a first precision level using a software algorithm, and the hardware-implemented portion of the evaluation layer being configured to generate second object data of a second precision level lower than the first precision level using a hardware algorithm. The evaluation layer further comprises a signal combiner configured to combine the first and second object data to generate output object data for delivery to the recognition layer. By way of example only, the evaluation layer may be implemented in the form of an evaluation subsystem of a gesture recognition system of the image processor.

20 Claims, 7 Drawing Sheets

(51) Int. Cl.
 G06T 7/00 (2006.01)
 G06T 3/00 (2006.01)
 G06T 3/40 (2006.01)
 G06T 19/20 (2011.01)

(52) U.S. Cl.
 CPC ............... *G06T3/0006* (2013.01); *G06T 3/403* (2013.01); *G06T 7/0085* (2013.01); *G06T 19/20* (2013.01); *G06T 2200/04* (2013.01); *G06T 2200/21* (2013.01); *G06T 2207/20048* (2013.01); *G06T 2207/20136* (2013.01); *G06T 2207/20192* (2013.01); *G06T 2219/2004* (2013.01)

(56) References Cited

U.S. PATENT DOCUMENTS

| | | | | |
|---|---|---|---|---|
| 6,674,799 | B2 * | 1/2004 | Rhee | H04N 7/014 348/445 |
| 6,904,163 | B1 * | 6/2005 | Fujimura | G06T 7/0012 378/162 |
| 7,027,054 | B1 * | 4/2006 | Cheiky | H04N 5/262 345/473 |
| 7,333,677 | B2 * | 2/2008 | Sakai | G01N 21/95607 358/450 |
| 8,553,037 | B2 * | 10/2013 | Smith | G06T 13/40 345/473 |
| 2002/0097916 | A1 | 7/2002 | Kaizu | |
| 2004/0207642 | A1 | 10/2004 | Crisu et al. | |
| 2004/0239677 | A1 | 12/2004 | Mutanen et al. | |
| 2005/0129323 | A1 | 6/2005 | Glickman | |
| 2008/0158375 | A1 | 7/2008 | Kakkori et al. | |
| 2010/0060717 | A1 | 3/2010 | Klein Gunnewiek et al. | |
| 2010/0157079 | A1 | 6/2010 | Atanassov et al. | |

OTHER PUBLICATIONS

Wikipedia, "Motion Interpolation," http://en.wikipedia.org/wiki/Motion_interpolation, Jan. 2014, 4 pages.

William K. Pratt, "Digital Image Processing," PIKS Inside, Third Edition, 2001, 738 pages.

* cited by examiner

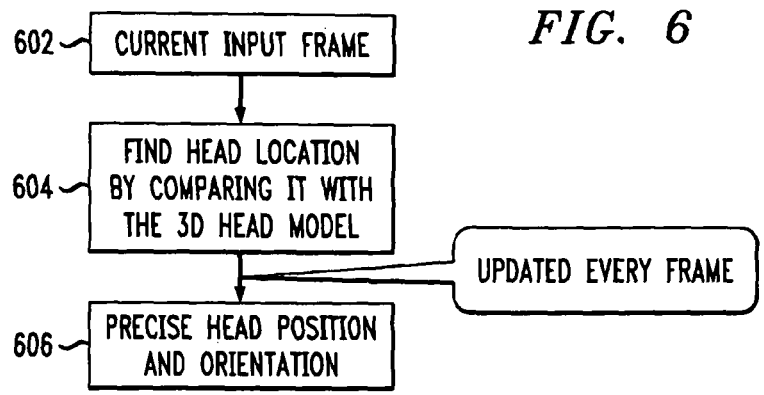
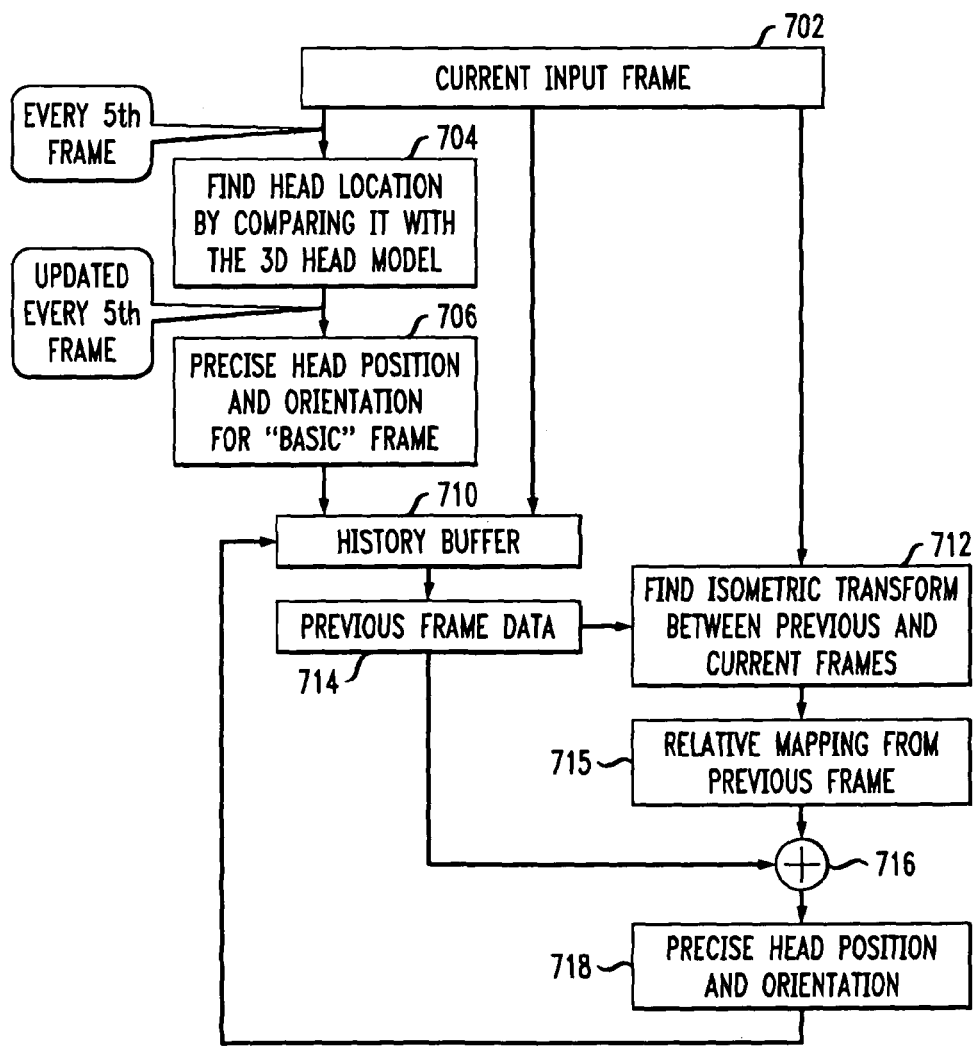

IMAGE PROCESSOR WITH EVALUATION LAYER IMPLEMENTING SOFTWARE AND HARDWARE ALGORITHMS OF DIFFERENT PRECISION

FIELD

The field relates generally to image processing, and more particularly to processing of image data in an image processor.

BACKGROUND

Image processing is important in a wide variety of different applications, and such processing may involve two-dimensional (2D) images, three-dimensional (3D) images, or combinations of multiple images of different types. For example, a 3D image of a spatial scene may be generated in an image processor using triangulation based on multiple 2D images captured by respective cameras arranged such that each camera has a different view of the scene. Alternatively, a 3D image can be generated directly using a depth imager such as a structured light (SL) camera or a time of flight (ToF) camera. These and other 3D images, which are also referred to herein as depth images, are commonly utilized in machine vision applications such as gesture recognition.

In typical conventional arrangements, raw image data from an image sensor is usually subject to various preprocessing operations. Such preprocessing operations may include, for example, contrast enhancement, histogram equalization, noise reduction, edge highlighting and coordinate space transformation, among many others. The preprocessed image data is then subject to additional processing needed to implement gesture recognition or another machine vision application.

SUMMARY

In one embodiment, an image processor comprises image processing circuitry implementing a plurality of processing layers including at least an evaluation layer and a recognition layer. The evaluation layer comprises a software-implemented portion and a hardware-implemented portion, with the software-implemented portion of the evaluation layer being configured to generate first object data of a first precision level using a software algorithm, and the hardware-implemented portion of the evaluation layer being configured to generate second object data of a second precision level lower than the first precision level using a hardware algorithm. The evaluation layer further comprises a signal combiner configured to combine the first and second object data to generate output object data for delivery to the recognition layer.

The evaluation layer may be illustratively coupled between a preprocessing layer of the image processor and the recognition layer, with the preprocessing layer receiving raw image data from an image sensor and providing preprocessed image data to the evaluation layer, although numerous other arrangements are possible.

By way of example only, the evaluation layer may be implemented in the form of an evaluation subsystem of a gesture recognition system of the image processor.

Other embodiments of the invention include but are not limited to methods, apparatus, systems, processing devices, integrated circuits, and computer-readable storage media having computer program code embodied therein.

BRIEF DESCRIPTION OF THE DRAWINGS

FIGS. 6 through 8 are flow diagrams showing respective sets of processing operations in respective embodiments of an evaluation layer of the image processor in the FIG. 1 system, using a head tracking application as an example.

DETAILED DESCRIPTION

Embodiments of the invention will be illustrated herein in conjunction with exemplary image processing systems comprising image processors or other types of processing devices that implement gesture recognition functionality using multiple processing layers. It should be understood, however, that embodiments of the invention are more generally applicable to any image processing system or associated device or technique that can benefit from more efficient image processing.

Figure 1:
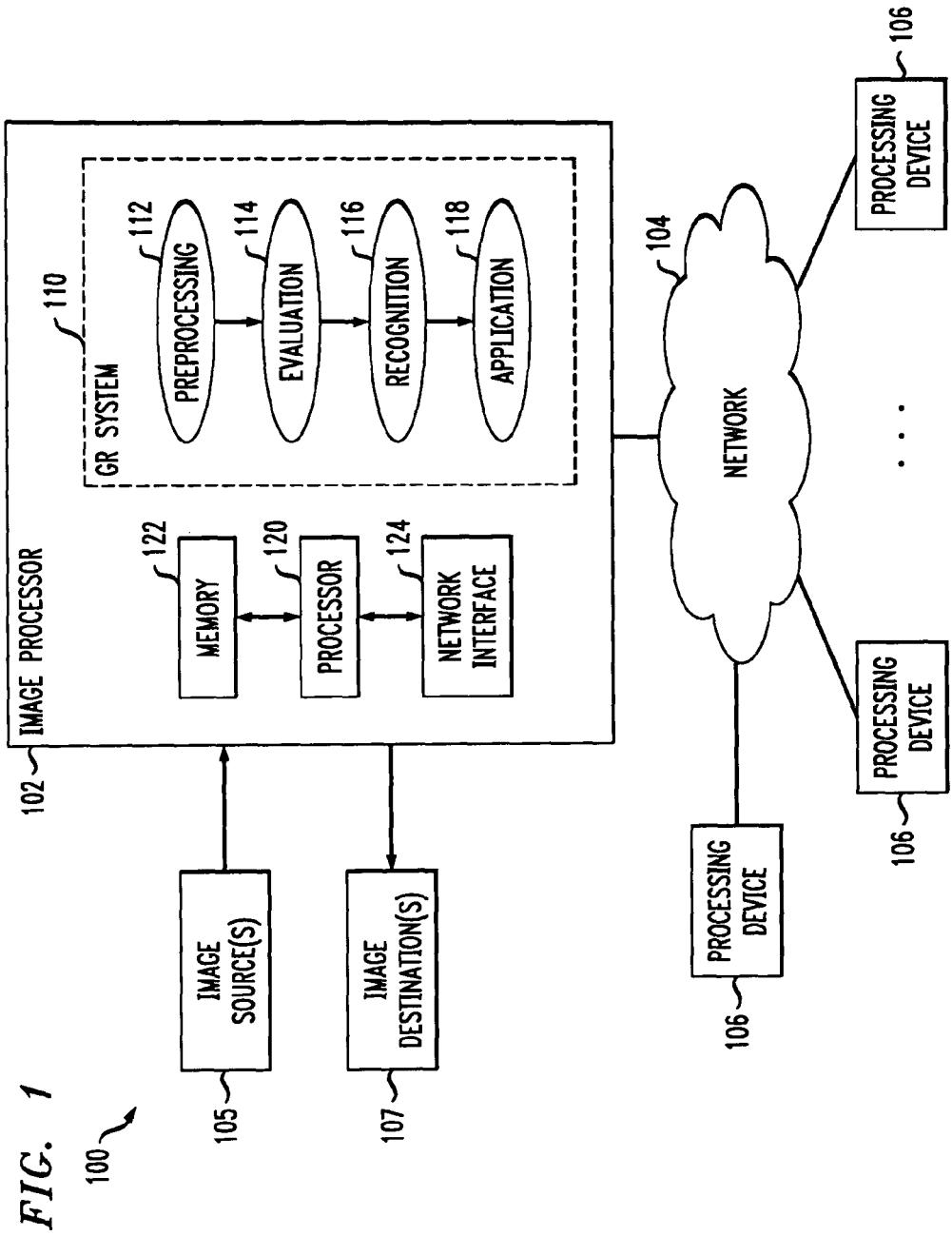
FIG. 1 is a block diagram of an image processing system comprising an image processor configured with gesture recognition functionality using preprocessing, evaluation, recognition and application layers in one embodiment.

FIG. 1 shows an image processing system 100 in an embodiment of the invention. The image processing system 100 comprises an image processor 102 that receives images from one or more image sources 105 and provides processed images to one or more image destinations 107. The image processor 102 also communicates over a network 104 with a plurality of processing devices 106.

Although the image source(s) 105 and image destination(s) 107 are shown as being separate from the processing devices 106 in FIG. 1, at least a subset of such sources and destinations may be implemented as least in part utilizing one or more of the processing devices 106. Accordingly, images may be provided to the image processor 102 over network 104 for processing from one or more of the processing devices 106. Similarly, processed images may be delivered by the image processor 102 over network 104 to one or more of the processing devices 106. Such processing devices may therefore be viewed as examples of image sources or image destinations.

A given image source may comprise, for example, a 3D imager such as an SL camera or a ToF camera configured to generate depth images, or a 2D imager configured to generate grayscale images, color images, infrared images or other types of 2D images. It is also possible that a single imager or other image source can provide both a depth image and a corresponding 2D image such as a grayscale image, a color image or an infrared image. For example, certain types of existing 3D cameras are able to produce a depth map of a given scene as well as a 2D image of the same scene. Alternatively, a 3D imager providing a depth map of a given scene can be arranged in proximity to a separate high-resolution video camera or other 2D imager providing a 2D image of substantially the same scene.

It is also to be appreciated that a given image source as that term is broadly used herein may represent an image sensor portion of an imager that incorporates at least a portion of the image processor 102. For example, at least one of the one or more image sources 105 may comprise a depth sensor, with the depth sensor being part of an SL camera, a ToF camera or other depth imager that incorporates the image processor 102. Numerous alternative arrangements are possible. For example, another example of an image source is a storage device or server that provides images to the image processor 102 for processing.

A given image destination may comprise, for example, one or more display screens of a human-machine interface of a computer or mobile phone, or at least one storage device or server that receives processed images from the image processor 102.

Accordingly, although the image sources) 105 and image destination(s) 107 are shown as being separate from the image processor 102 in FIG. 1, the image processor 102 may be at least partially combined with at least a subset of the one or more image sources and the one or more image destinations on a common processing device. Thus, for example, a given image source and the image processor 102 may be collectively implemented on the same processing device. Similarly, a given image destination and the image processor 102 may be collectively implemented on the same processing device.

In the present embodiment, the image processor 102 comprises a gesture recognition (GR) system 110 that is implemented using multiple processing layers of the image processor 102. These processing layers comprise at least a portion of what is more generally referred to herein as "image processing circuitry" of the image processor 102. The processing layers in this embodiment are shown as respective ovals in the figure and comprise a preprocessing layer 112 and a plurality of higher processing layers, including an evaluation layer 114, a recognition layer 116 and an application layer 118.

The processing layers 112, 114, 116 and 118 may also be referred to herein as respective subsystems of the GR system 110. It should be noted, however, that embodiments of the invention are not limited to gesture recognition, but can instead be adapted for use in a wide variety of other machine vision applications, and may comprise different numbers, types and arrangements of layers in other embodiments.

Also, certain of the processing layers of the image processor 102 may instead be implemented at least in part on other devices in other embodiments. For example, preprocessing layer 112 may be implemented at least in part in an image source 105 comprising a depth imager or other type of imager. It is also possible that application layer 118 may be implemented on a separate processing device than the evaluation layer 114 and recognition layer 116, such as one of the processing devices 106.

Moreover, it is to be appreciated that the image processor 102 may itself comprise multiple distinct processing devices, such that the processing layers 112, 114, 116 and 118 are implemented using two or more processing devices. The term "image processor" as used herein is intended to be broadly construed so as to encompass these and other arrangements.

The preprocessing layer 112 performs preprocessing operations on received image data from the one or more image sources 105. This received image data in the present embodiment is assumed to comprise raw image data received from a depth sensor, but other types of received image data may be processed in other embodiments. The preprocessing layer 112 provides preprocessed image data to the evaluation layer 114.

The raw image data received in the preprocessing layer 112 from the depth sensor may include a stream of frames comprising respective depth images, with each such depth image comprising a plurality of depth image pixels. For example, a given depth image D may be provided to the preprocessing layer 112 in a form of matrix of real values. Each such real value may more particularly provide a depth value $d_{ij}$ for a particular pixel of the depth image, where i and j denote pixel indices, and the depth value represents distance to an imaged object. A given such depth image is also referred to herein as a depth map.

A given pixel with indexes i,j and a depth value $d_{ij}$ can be transformed to (x,y,z) coordinates in 3D space. Also, if the depth is unknown for a given pixel, a predefined value u (e.g., zero) may be used as the depth value for that pixel. A wide variety of other types of image data may be used in other embodiments.

In some embodiments, a sensor that generates the depth values for the pixels may also provide corresponding reliability values for those pixels. For example, each pixel (i,j) supplied by a sensor of that type may comprise a pair $(d_{ij}, r_{ij})$ where $0 \leq r_{ij} \leq 1$ is a depth image pixel reliability indicator or other type of reliability value. Alternatively, reliability values may be estimated or otherwise determined in the preprocessing layer 112 based on known characteristics of the particular type of sensor. The reliability values may be part of a separate reliability matrix that is utilized in one or more of the other processing layers.

Again, the above-described image data types are exemplary only, and the disclosed techniques can be adapted for use with numerous different types of image data streams, including streams with high frame rates.

As will be described in greater detail below in conjunction with FIGS. 4 and 5, the evaluation layer 114 more particularly comprises a software-implemented portion and a hardware-implemented portion, with the software-implemented portion of the evaluation layer being configured to generate first object data of a first precision level using a software algorithm, and the hardware-implemented portion of the evaluation layer being configured to generate second object data of a second precision level lower than the first precision level using a hardware algorithm. The evaluation layer 114 further comprises a signal combiner configured to combine the first and second object data to generate output object data for delivery to the recognition layer 116. The object data may have multiple parts, such as a constant part and a variable part.

By way of example, the object data may comprise so-called "skeleton" data describing one or more imaged objects, with the constant part of the skeleton data comprising skeleton sizes and the variable part of the skeleton data comprising skeleton angles and mass center position. Numerous other types of object data may be used in other embodiments, and such object data need not comprise separate constant and variable parts. The object data or portions thereof may take on various forms, such as matrix or vector forms, as will be appreciated by those skilled in the art. The term "object data" as used herein is therefore intended to be broadly construed so as to encompass, for example, data relating to one or more objects detected in or otherwise associated with preprocessed image data.

The recognition layer 116 in this embodiment utilizes object data provided by the evaluation layer 114 to perform high-level application-specific image processing, which is assumed to comprise at least gesture recognition, but could additionally or alternatively comprise other types of high-level application-specific image processing such as activity recognition, emotion recognition and gaze tracking.

The application layer 118 in the present embodiment is assumed to comprise at least one gesture recognition application that utilizes gesture recognition output of the recognition layer 116, such as a parametric representation of an imaged scene. Other types of processed image data outputs may be provided to one or more application layers of the image processor 102 or a related processing device 106 or destination 107.

In the case of the above-noted skeleton data, this data is provided by the evaluation layer 114 to the recognition layer 116 which classifies current object state in terms required by the specific application layer 118. For example, if the gesture recognition application implemented by the application layer involves the generation of commands responsive to detection of respective distinct hand gestures, the recognition layer 116 is configured to detect such gestures and to provide appropriate classification outputs to the application layer.

The processing layers 112, 114, 116 and 118 may comprise different portions of image processing circuitry of the image processor 102, although a given such processing layer may be implemented as a combination of hardware, firmware and software. The term "layer" as utilized herein is therefore intended to be broadly construed, and may comprise, for example, specialized hardware, processing cores, firmware engines and associated firmware, or general-purpose processing resources and associated software executing on those resources, as well as various combinations of these and other types of image processing circuitry. A subsystem of a given GR system is assumed to be an example of a processing layer as that latter term is broadly utilized herein.

An otherwise conventional image processing integrated circuit or other type of image processing circuitry may be suitably modified to implement at least a portion of one or more of the processing layers 112, 114, 116 and 118 of image processor 102, as will be appreciated by those skilled in the art. One possible example of image processing circuitry that may be used in one or more embodiments of the invention is an otherwise conventional graphics processor suitably reconfigured to perform functionality associated with one or more of the processing layers 112, 114, 116 and 118.

The processing devices 106 may comprise, for example, computers, mobile phones, servers or storage devices, in any combination. One or more such devices also may include, for example, display screens or other user interfaces that are utilized to present images generated by the image processor 102. The processing devices 106 may therefore comprise a wide variety of different destination devices that are configured to receive processed image streams or other types of output information from the image processor 102 over the network 104, including by way of example at least one server or storage device that receives such output information from the image processor 102.

An "image destination" as that term is broadly used herein is intended to encompass any device or portion thereof that receives information derived from one or more images processed by the image processor 102, such as a device that receives gesture recognition outputs generated by the GR system 110. Accordingly, an image destination may receive at least one processed image, a portion of at least one processed image, or information derived from at least a portion of at least one processed image.

Although shown as being separate from the processing devices 106 in the present embodiment, the image processor 102 may be at least partially combined with one or more of the processing devices 106. Thus, for example, the image processor 102 may be implemented at least in part using a given one of the processing devices 106. By way of example, a computer or mobile phone may be configured to incorporate the image processor 102 and possibly a given image source. The image source(s) 105 may therefore comprise cameras or other imagers associated with a computer, mobile phone or other processing device. As indicated previously, the image processor 102 may be at least partially combined with one or more image sources or image destinations on a common processing device.

The image processor 102 in the present embodiment is assumed to be implemented using at least one processing device and comprises a processor 120 coupled to a memory 122. The processor 120 executes software code stored in the memory 122 in order to control the performance of image processing operations. The image processor 102 also comprises a network interface 124 that supports communication over network 104.

The processing layers 112, 114, 116 and 118 as well as processor 120, memory 122 and network interface 124 are considered examples of what is more generally referred to herein as image processing circuitry of the image processor 102.

The processor 120 may comprise, for example, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of image processing circuitry, in any combination.

The memory 122 stores software code for execution by the processor 120 in implementing portions of the functionality of image processor 102, such as portions of the preprocessing layer 112 and the higher processing layers 114, 116 and 118. A given such memory that stores software code for execution by a corresponding processor is an example of what is more generally referred to herein as a computer-readable medium or other type of computer program product having computer program code embodied therein, and may comprise, for example, electronic memory such as random access memory (RAM) or read-only memory (ROM), magnetic memory, optical memory, or other types of storage devices in any combination. As indicated above, the processor may comprise portions or combinations of a microprocessor, ASIC, FPGA, CPU, ALU, DSP or other image processing circuitry.

It should be apparent from the foregoing description that embodiments of the invention may be implemented in the form of integrated circuits. In a given such integrated circuit implementation, identical die are typically formed in a repeated pattern on a surface of a semiconductor wafer. Each die includes an image processor or other image processing circuitry as described herein, and may include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

The particular configuration of image processing system 100 as shown in FIG. 1 is exemplary only, and the system 100 in other embodiments may include other elements in addition to or in place of those specifically shown, including one or more elements of a type commonly found in a conventional implementation of such a system.

For example, in some embodiments, the image processing system 100 is implemented as a video gaming system or other type of gesture-based system that processes image streams in order to recognize user gestures. The disclosed techniques can be similarly adapted for use in a wide variety of other systems requiring a gesture-based human-machine interface, and can also be applied to applications other than gesture recognition, such as machine vision systems in robotics and other industrial applications.

The operation of the image processor 102 in illustrative embodiments will now be described in greater detail with reference to FIGS. 2 through 8. It is to be appreciated that the exemplary features and functionality described in conjunction with these figures need not be present in other embodiments.

Figure 2:
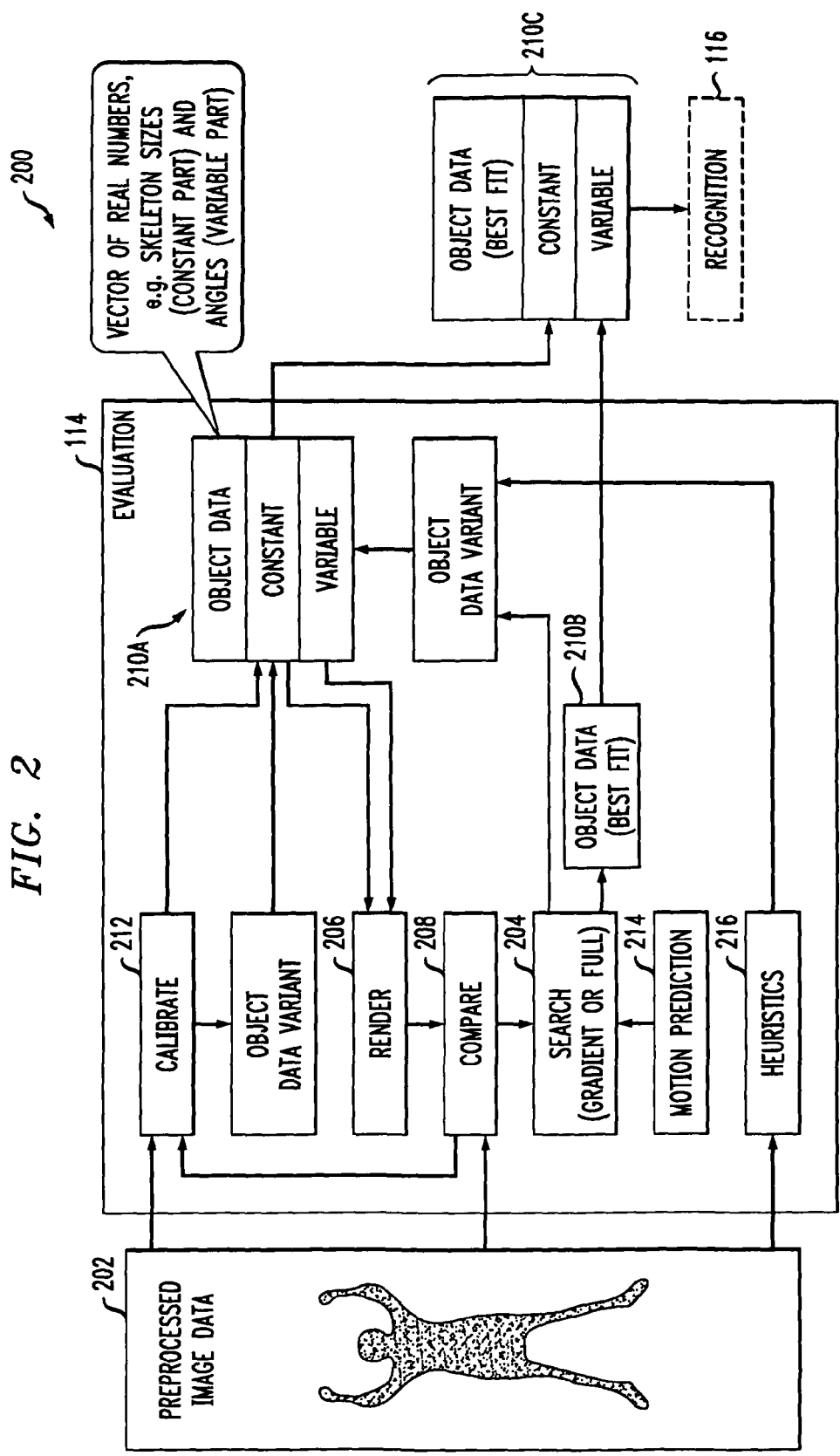
FIGS. 2 through 5 illustrate aspects of an exemplary evaluation layer of the image processor in the FIG. 1 system.

Referring initially to FIG. 2, a portion 200 of the image processor 102 comprises evaluation layer 114 coupled to recognition layer 116. The evaluation layer 114 receives as its input preprocessed image data 202 from the preprocessing layer 112. As mentioned previously, such image data is assumed to comprise one or more preprocessed depth images, although other types of image data can be used.

In this embodiment, the evaluation layer 114 implements search-render-compare operations in generating the object data. These operations are carried out by respective search, render and compare modules 204, 206 and 208 of the evaluation layer 114, and involve processing or generation of object data 210A, 210B and 210C and associated object data variants as shown. Object data 210A is combined with best fit object data 210B to yield output best fit object data 210C for delivery to the recognition layer 116. The object data 210A in this embodiment is assumed to comprise a vector of real numbers having a constant part and a variable part. For example, as mentioned previously, the object data may comprise skeleton data, with the constant part comprising skeleton sizes and the variable part comprising skeleton angles and other variable data such as mass center position.

The evaluation layer 114 in this embodiment further comprises a calibrate module 212, a motion prediction module 214 and a heuristics module 216. The calibrate module 212 calculates the constant part of the skeleton data using a current input depth image, also referred to herein as a current input frame. Other initial object parameters are determined using compare module 208 and heuristics module 216, both of which operate on the current input depth image.

The search-render-compare operations generally involve varying object parameters in a manner defined by a particular search implemented by search module 204, which may be a gradient search or a full search, followed by render and compare operations performed by respective modules 206 and 208. The full search may be a type of search also referred to as an exhaustive search. The gradient search or full search may make use of motion prediction information provided by motion prediction module 214.

The render operation in this embodiment generates a rendered depth image corresponding to a current set of object parameters. The search goal may be characterized as minimizing the distance between the rendered depth image and the current input depth image using a specified comparison primitive such as least squares based on a distance metric such as Euclidean distance or Manhattan distance. In other words, the search operation varies the object parameters until the corresponding rendered depth image is determined to be sufficiently close to the input depth image using the comparison primitive. The rendered depth image and the input depth image are typically represented as respective matrices of real numbers, although other image data arrangements could be used.

The complexity of the search-render-compare process will typically depend on the number of object parameters to be determined, or in other words the number of degrees of freedom of the process. For example, for N degrees of freedom, a full search will utilize e iterations of render and compare, where k in this context denotes a number of variants for each degree of freedom, while a gradient search will utilize $(N+1) \cdot m$ iterations of render and compare, where m is a number of steps in the direction of the gradient. The gradient search can be configured to recalculate the gradient each s steps, which reduces the number of iterations of render and compare to $(N+1) \cdot m/s+m$.

The particular number of degrees of freedom and iterations used in a given implementation of the evaluation layer 114 will vary depending upon the particular gesture recognition application. For example, a head tracking application, assuming a head to be a solid object (e.g., rigid body), may be configured to use 6 degrees of freedom (e.g., x, y and z dimensions and 3 Euler angles) and slow movement (i.e., few iterations). In an application of this type, both full search and gradient search can operate in real time even if implemented in software. As another example, a hand tracking application may be configured to use 25 degrees of freedom for each hand and fast movement (i.e., many iterations). In an application of this type, the full search typically cannot operate in real time, even if implemented in hardware, although the gradient search can operate in real time with use of parallelism.

However, it should be noted that the number of degrees of freedom and the number of variants for each degree can be reduced by using heuristics module 216. This may involve, for example, calculating certain object parameters.

Figure 3:
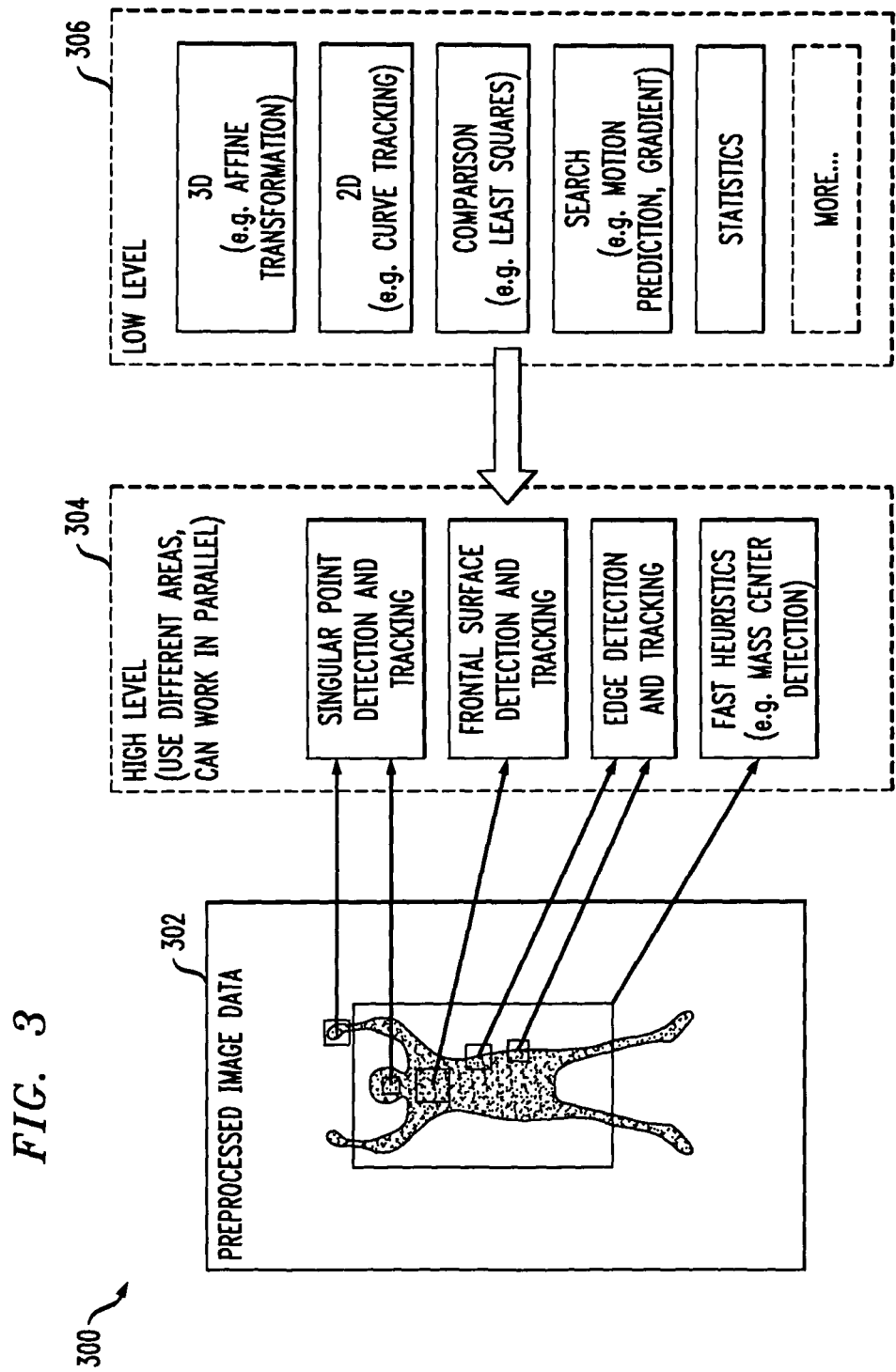

FIG. 3 illustrates certain of the processing operations 300 performed on preprocessed image data 302 in the evaluation layer 114. The processing operations are generally characterized in this embodiment as comprising high-level processing operations 304 and low-level image processing primitives 306.

As will be described in greater detail below in conjunction with FIG. 5, the high-level processing operations 304 are generally executed in the software-implemented portion of the evaluation layer 114, and the low-level image processing primitives are generally executed in the hardware-implemented portion of the evaluation layer 114.

The high-level processing operations 304 in this embodiment include singular point detection and tracking, frontal surface detection and tracking, edge detection and tracking, and fast heuristics such as mass center detection. Each of these exemplary operations uses different areas of the input image, as illustrated in the figure, and so at least a subset of the operations can be effectively configured to work in parallel with one another. Thus, image processing circuitry of image processor 102 may comprise a multiprocessor system in which the high-level processing operations are parallelized.

The singular point detecting and tracking is used to identify objects such as the head and hands of an imaged individual. Such objects are usually considered highly important features for the recognition layer 116.

The frontal surface detection and tracking can provide different levels of reliability for different types of depth imagers. More particularly, depending on the depth imager type, different parts of a resulting depth image may contain different levels of noise, such that noise level can vary dramatically between frontal surfaces of an object and its edges. For example, an SL camera generally provides a depth image having relatively low noise at frontal surfaces and relatively high noise at edges. In this case, detected frontal surfaces are more reliable than detected edges.

The edge detection and tracking can also provide different levels of reliability for different types of depth imagers. For example, a ToF camera generally provides less noisy object edges than an SL camera. In this case, detected edges are more reliable than detected frontal surfaces.

With regard to the fast heuristics, these generally operate on larger image areas, and therefore require fewer accesses to the image data.

The low-level image processing primitives 306 include 3D primitives such as an affine or isometric transformation, 2D primitives such as curve tracking, comparison primitives such as least squares comparison, search primitive such as motion prediction or gradient search, and statistics primitives, and possibly others. These low-level processing primitives 306 are utilized by one or more of the high-level processing operations 304. As one example, the edge detection and tracking operation may utilize curve tracking.

As indicated above, the evaluation layer 114 is configured to include a software-implemented portion and a hardware-implemented portion. Examples of such an arrangement will now be described in greater detail with reference to FIGS. 4 and 5.

Figure 4:
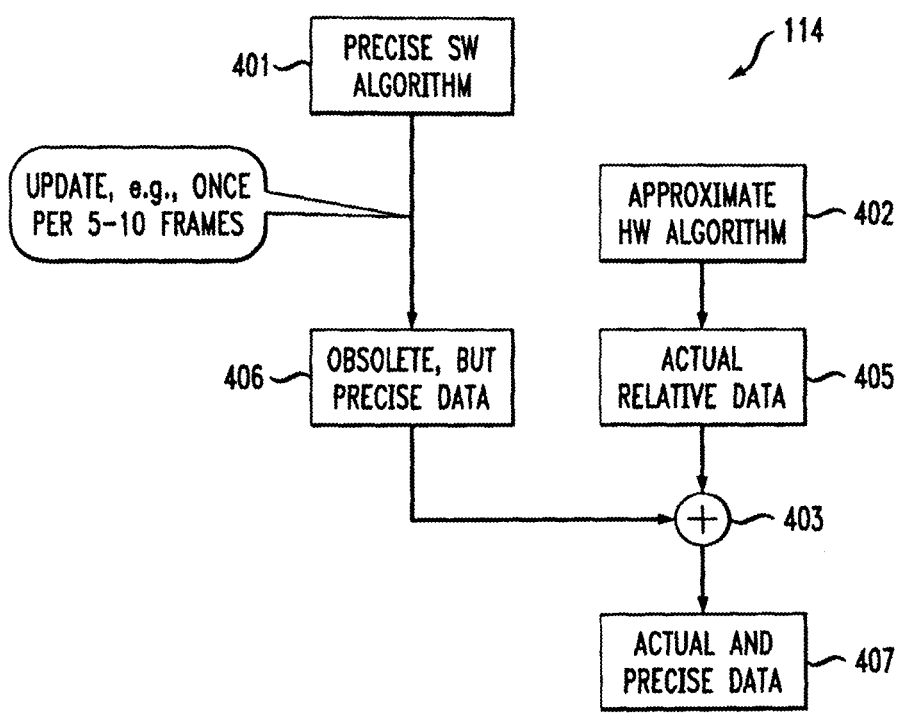

Referring initially to FIG. 4, the evaluation layer 114 includes a precise software (SW) algorithm 401 and an approximate hardware (HW) algorithm 402 which are assumed to be part of the respective software-implemented and hardware-implemented portions of the evaluation layer. The terms "precise" and "approximate" as used in the context of the respective algorithms 401 and 402 are examples of what are more generally referred to herein as respective precision levels, and other types of precision levels can be used to the respective software and hardware algorithms in other embodiments. The precise software algorithm 401 and the approximate hardware algorithm 402 generate object data at respective relatively high and relatively low levels of precision.

The evaluation layer 114 further comprises a signal combiner 403 configured to combine the first and second object data to generate output object data for delivery to the recognition layer 116. As mentioned previously, the object data may have multiple parts, such as a constant part and a variable part. Elements 405, 406 and 407 in the figure denote different sets of object data, to be described in more detail below.

The first object data generated using the precise software algorithm 401 more particularly comprises obsolete but precise data 406, and the second object data generated by the approximate hardware algorithm 402 comprises actual relative data 405. The first and second object data are combined in signal combiner 403 to yield actual and precise data 407 which is provided to the recognition layer 116. The actual and precise data 407 in the present embodiment is generated in real time and provides a reliable precision for subsequent processing in the recognition layer. More particularly, in this embodiment, the object data is computed as a sum or other function of precise delayed data provided by the software algorithm 401 and approximate relative data provided by the hardware algorithm 402. The software and hardware algorithms generally run in parallel with one another.

Due to its high level of precision, the software algorithm 401 is unable to run in real time, but instead generates precise object data with a particular latency, in this case about 5 to 10 frames. The approximate hardware algorithm 402 operates with a lower level of precision and is able to run in real time with little or no latency. It calculates relative object state in the form of actual relative data 405. This actual relative data is added in signal combiner 403 to the last known precise object state in the form of obsolete but precise data 406 as calculated by the software algorithm 401. The result is the current object state in the form of actual and precise data 407.

As indicated above, the first object data comprising obsolete but precise data 406 generated by software algorithm 401 is updated at a rate of about once every 5 to 10 frames. The term "obsolete" in this context indicates that the corresponding object data relates to one or more previous frames rather than to a current frame.

It should be noted that the update rate of about once every 5 to 10 frames may be viewed as a type of worst case estimation, and different update rates may be used depending on the capabilities and configuration of the image processor 102. For example, if more powerful image processing circuitry is used or the complexity of the processing operations is reduced, the update rate may be increased, although it is still expected that the software algorithm 401 will not operate in real time. The speed of the software algorithm 401 will also depend on other factors such as the characteristics of the actual image data being processed. For example, a full search may in some cases determine a solution at its first steps.

The second object data comprising actual relative data 405 in this embodiment is assumed to be updated at a significantly higher rate than the first object data, and more particularly with every input frame. Thus, in the present embodiment, the first object data generated using software algorithm 401 is updated at a rate that is less than once per input frame, and the second object data generated using hardware algorithm 402 is updated at a rate that is once per input frame. Other rates associated with object data of different precision may be used in other embodiments.

Figure 5:
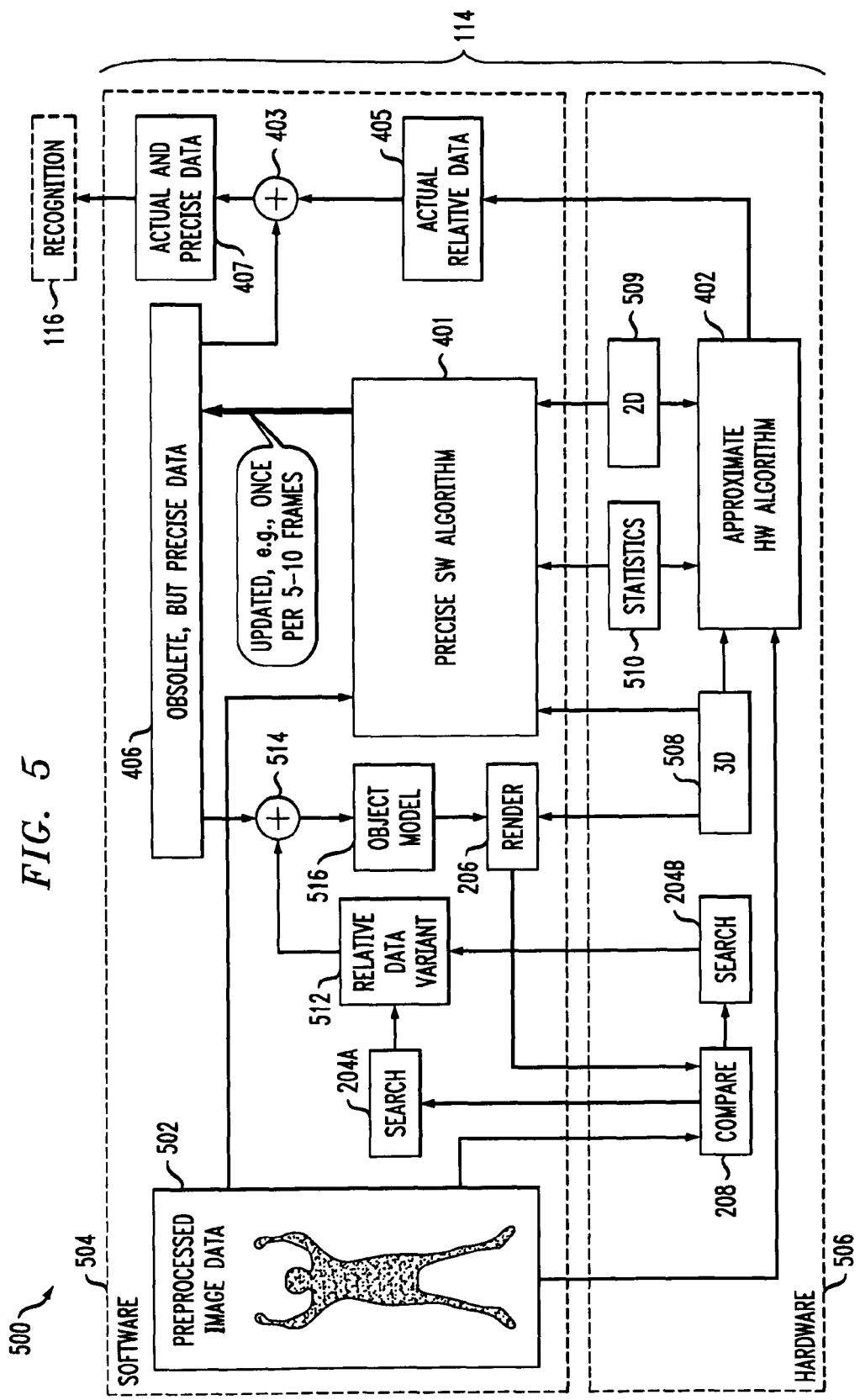

FIG. 5 shows a more detailed view of a portion 500 of the image processor 102 and illustrates the manner in which preprocessed image data 502 is processed in evaluation layer 114 using the precise software algorithm 401, the approximate hardware algorithm 402 and other associated processing modules. The software algorithm 401 and the hardware algorithm 402 are arranged in respective software-implemented and hardware-implemented portions 504 and 506 of the evaluation layer 114. The software-implemented and hardware-implemented portions 504 and 506 of the evaluation layer 114 are also referred to herein as software and hardware portions, respectively.

The low-level image processing primitives described in conjunction with FIG. 3 are implemented in hardware in portion 506 of the evaluation layer 114. These low-level primitives include, for example, 3D primitives 508, 2D primitives 509 and statistics primitives 510, as well as the search and comparison functionality. This allows the low-level primitives to be efficiently shared by high-level processing operations implemented in software in portion 504 of the evaluation layer 114.

The 3D primitives 508 are used to perform affirm or isometric transformation operations such as shift and rotation in order to support the render module 206. The 3D primitives can also support other high-level processing operations such as frontal surface detection and tracking.

The 2D primitives 509 are used to support high-level processing operations such as edge detection and tracking.

The statistics primitives 510 are utilized by both the software algorithm 401 and the hardware algorithm 402. For example, the statistics primitive 510 can be used to estimate error levels for different parts of an image.

The search-render-compare processing is separated between the software and hardware portions 504 and 506 of the evaluation layer 114 in this embodiment. More particularly, the functionality of search module 204 of FIG. 2 is separated into two search modules 204A and 204B implemented in the respective software and hardware portions 504 and 506, with the two search modules 204A and 204B being utilized to generate relative data variant 512. Also, the render module 206 is implemented in software portion 504 and the compare module 208 is implemented in hardware portion 506.

Additional elements implemented in the software portion 504 include the signal combiner 403, as well as an additional signal combiner 514 and an object model 516. The object model 516 in the present embodiment is utilized to provide data for the render module 206.

Although not explicitly shown in FIG. 5, an arbiter may be implemented in the hardware portion 506 in order to control access by the software and hardware search modules 204A and 204B to the render and compare modules 206 and 208.

Such an arbiter can use a strict priority approach in which access requests from the software search module 204A are handled with the highest priority.

Figure 8:
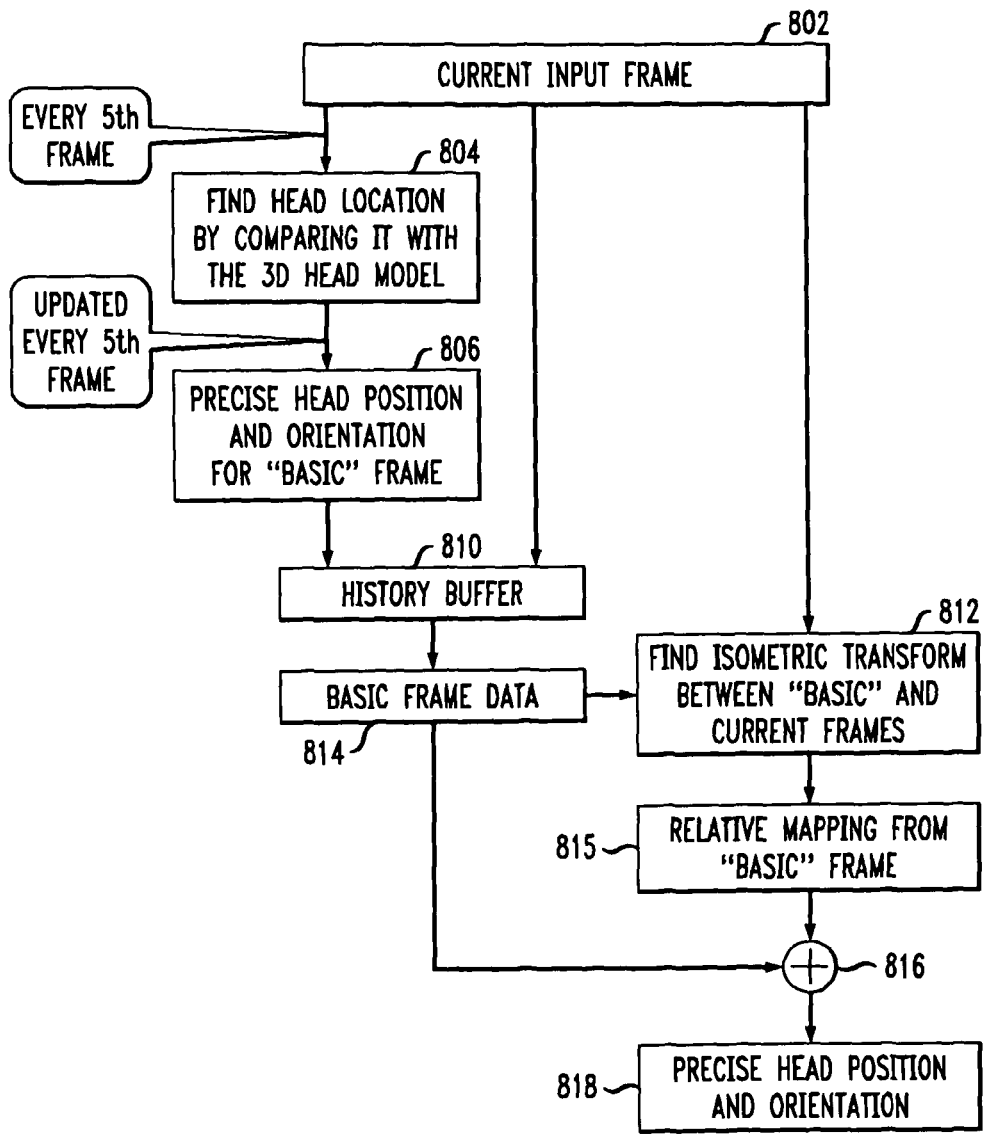

FIGS. 6 through 8 show three different embodiments of sets of processing operations that may be implemented in the evaluation layer 114, illustratively in the context of a head tracking application of the GR system 110. In these embodiments, it is assumed that the evaluation layer implements at least head detection and tracking functionality, although additional or alternative types of high-level processing operations may be configured in a similar manner. It is also to be appreciated that the particular steps, data and other features of these exemplary processes are exemplary only, and additional or alternative steps, data and other features can be used in other embodiments.

In the FIG. 6 embodiment, the separate software and hardware algorithms 401 and 402 are not utilized. Instead, a current input frame is processed using only the software algorithm 401 which in step 604 finds head location by comparison with a 3D head model. As indicated in the figure, this process is updated every frame to provide precise head position and orientation 606. However, it is assumed that full search rather than gradient search is utilized, and accordingly the precise head position and orientation 606 is generated with a latency of k frames, where typically k<5. Again, the latency will generally be a function of factors such as the type of image processing circuitry used, the complexity of the processing operations, and characteristics of the actual image data being processed. Note that k in this context refers to latency in number of frames, although the same variable has a different meaning in another context herein.

In the FIG. 7 embodiment, the software and hardware algorithms 401 and 402 are both utilized to process a current input frame 702. Step 704 corresponds generally to step 604 of FIG. 6 but is performed only every $5^{th}$ frame, also referred to as a "basic" frame, rather than for each frame.

It is assumed that step 704 is carried out by the software algorithm 401 and performs the same full search approach as step 604. The resulting precise head position and orientation 706 for the basic frame is updated every $5^{th}$ frame. The current input frame 702 and the precise head position and orientation 706 are stored in a history buffer 710.

It is further assumed that step 712 is carried out by the hardware algorithm 402. Step 712 is applied to each input frame including the current input frame 702, and involves finding a best-fitting isometric transform between a previous frame and the current input frame, possibly utilizing fast heuristics. The previous frame is part of previous frame data 714 taken from the history buffer 710. The resulting isometric transform is applied to determine a relative mapping 715 from the previous frame. The relative mapping 715 is combined with the previous frame data 714 as indicated by combining step 716 to produce precise head position and orientation information 718.

As noted above, the FIG. 7 embodiment updates the precise head position and orientation 706 every 5 frames, with a latency of k frames. Error accumulation is limited because errors are accumulated over at most 5+k frames. The overall latency of the combined software and hardware algorithm processing is less than or equal to one frame, and corresponds generally to the time required to determine the best-fitting isometric transform and to apply the relative mapping for the current input frame. Also, the configuration of evaluation layer 114 allows steps 704 and 712 to operate asynchronously, such that output data 718 can be updated as soon as basic frame data 706 is available.

The FIG. 8 embodiment is similar to the FIG. 7 embodiment, with current input frame 802, steps 804, 812, 816, history buffer 810 and data 806, 814, 815 and 818 corresponding to the respective current input frame 702, steps 704, 712, 716, history buffer 710 and data 706, 714, 715 and 718 of FIG. 7. However, instead of finding the best-fitting isometric transform between the current input frame and the previous frame as in FIG. 7, the FIG. 8 embodiment finds the isometric transform between the basic and current frames in step 812, yielding a relative mapping 815 from the basic frame, which is combined with the basic frame in step 816. The basic frame is obtained only every $5^{th}$ frame and the corresponding precise head and orientation 806 has a latency of k frames. Accordingly, the precise head orientation and position 818 at the output of the FIG. 8 process has limited latency and error accumulation, similar to that of the corresponding output object data generated in the FIG. 7 process.

Combinations of the exemplary processes shown in FIGS. 6 through 8 may be performed in parallel or otherwise in conjunction with one another, with output reliability indicators being used to select which process output will be used. For example, if a full search process used to generate the precise head position and orientation for a given basic frame includes significant errors, all outputs of the FIG. 8 process that utilize that basic frame will also include significant errors. Accordingly, an output verification module may be incorporated into the evaluation layer 114 to determine the reliability of outputs produced using multiple processes and to select the output from a particular process for use with a current input frame.

The reliability determination may be based, for example, on calculated distance between a head rendered using head position and orientation from a given process and head position and orientation from a predefined head model. Such an output verification module prevents unwanted error propagation and may be configured to operate in real time.

One possible implementation of the above-described output verification procedure is as follows:

1. Generate output based on previous frame using FIG. 7 process.

2. Estimate reliability of output generated in Step 1. If reliability is less than a predefined threshold, go to Step 3, and otherwise send Step 1 output to the recognition layer 116 and exit the output verification procedure.

3. Generate output based on last basic frame using FIG. 8 process.

4. Estimate reliability of output generated in Step 3.

5. Generate output based on basic frame other than last basic frame but otherwise using FIG. 8 process.

6. Estimate reliability of output generated in Step 5.

7. Compare reliability estimates from Steps 2, 4 and 6 and select output with highest reliability for delivery to recognition layer 116.

This exemplary output verification procedure does not significantly increase the latency of the evaluation layer 114 but allows the error rate associated with the object data output to be significantly decreased.

As indicated above, embodiments of the invention can involve machine vision applications other than gesture recognition. For example, techniques disclosed herein can be applied to image processing applications in which object data parameters can be calculated as a combination of a previous state and a relative offset, or in which processing algorithms have different complexities and latencies. Other examples include image processing applications in which a relatively simple algorithm is used to calculate an object data increment with reliable precision over multiple frames.

It should again be emphasized that the embodiments of the invention as described herein are intended to be illustrative only. For example, other embodiments of the invention can be implemented utilizing a wide variety of different types and arrangements of image processing circuitry, processing layers, processing modules, and processing operations than those utilized in the particular embodiments described herein. In addition, the particular assumptions made herein in the context of describing certain embodiments need not apply in other embodiments. These and numerous other alternative embodiments within the scope of the following claims will be readily apparent to those skilled in the art.

What is claimed is:

1. An image processor comprising:
   image processing circuitry implementing a plurality of processing layers including at least an evaluation layer and a recognition layer;
   the evaluation layer comprising a software-implemented portion and a hardware-implemented portion;
   the software-implemented portion of the evaluation layer being configured to generate first object data of a first precision level using a software algorithm;
   the hardware-implemented portion of the evaluation layer being configured to generate second object data of a second precision level lower than the first precision level using a-hardware algorithm;
   wherein the evaluation layer further comprises a signal combiner configured to combine the first and second object data to generate output object data for delivery to the recognition layer.

2. The image processor of claim 1 wherein the evaluation layer comprises an evaluation subsystem of a gesture recognition system.

3. The image processor of claim 1 wherein the plurality of processing layers further comprises a preprocessing layer that receives raw image data and provides preprocessed image data to the evaluation layer.

4. The image processor of claim 1 wherein the first object data is updated at a first rate and the second object data is updated at a second rate that is higher than the first rate.

5. The image processor of claim 1 wherein the first rate is less than once per input frame of the received image data and the-second rate is once per input frame.

6. The image processor of claim 1 wherein the first object data is generated based on a comparison between a current input frame and at least one object model.

7. The image processor of claim 1 wherein the second object data is generated based on a comparison between a current input frame and at least one previous input frame.

8. The image processor of claim 1 wherein the evaluation layer implements search-render-compare operations in generating the first and second object data.

9. The image processor of claim 8 wherein separate search modules associated with the search-render-compare operations are instantiated in each of the software-implemented portion and the hardware-implemented portion.

10. The image processor of claim 8 wherein a render module associated with the search-render-compare operations is instantiated only in the software-implemented portion and a compare module associated with the search-render-compare operations is instantiated only in the hardware-implemented portion.

11. The image processor of claim 1 wherein the software-implemented portion of the evaluation layer implements a plurality of high-level processing operations including one or more of singular point detection and tracking, frontal surface detection and tracking, edge detection and tracking, and fast heuristics such as mass center detection.

12. The image processor of claim 1 wherein the hardware-implemented portion of the evaluation layer implements a plurality of low-level image processing primitives including one or more of a 3D primitive such as an affine or isometric transformation, a primitive such as curve tracking, a comparison primitive such as least squares comparison, a search primitive such as motion prediction or gradient search, and a statistics primitive.

13. The image processor of claim 1 wherein the image processing circuitry comprises at least one graphics processor integrated circuit.

14. An integrated circuit comprising the image processor of claim 1.

15. A method comprising:
    configuring a plurality of processing layers of an image processor including at least an evaluation layer and a recognition layer;
    generating first object data of a first precision level using a software algorithm in a software-implemented portion of the evaluation layer;
    generating second object data of a second precision level lower than the first precision level using a hardware algorithm in a hardware-implemented portion of the evaluation layer; and
    combining the first and second object data to generate output object data for delivery to the recognition layer.

16. The method of claim 15 wherein generating first and second object data comprises:
    generating the first object data based on a comparison between a current input frame and at least one object model; and
    generating the second object data based on a comparison between a current input frame and at least one previous input frame;
    wherein the first object data is updated at a first rate and the second object data is updated at a second rate that is higher than the first rate.

17. A non-transitory computer-readable storage medium having computer program code embodied therein, wherein the computer program code when executed in a processing device causes the processing device to perform the method of claim 15.

18. An image processing system comprising:
    one or more image sources providing image data;
    one or more image destinations; and
    an image processor coupled to said one or more image sources and said one or more image destinations;
    wherein the image processor comprises:
    image processing circuitry implementing a plurality of processing layers including at least an evaluation layer and a recognition layer;
    the evaluation layer comprising a software-implemented portion and a hardware-implemented portion;
    the software-implemented portion of the evaluation layer being configured to generate first object data of a first precision level using a software algorithm;
    the hardware-implemented portion of the evaluation layer being configured to generate second object data of a second precision level lower than the first precision level using a hardware algorithm;
    wherein the evaluation layer further comprises a signal combiner configured to combine the first and second object data to generate output object data for delivery to the recognition layer.

19. The system of claim 18 wherein at least one of the one or more image sources comprises a depth sensor.

20. The system of claim 19 herein the depth sensor is part of a depth imager that incorporates the image processor.

* * * * *